Sept. 18, 1923.

C. M. BULLARD 1,468,353

METHOD OF AND APPARATUS FOR TREATING LIQUIDS

Filed Dec. 4, 1920

Inventor:
Charles M. Bullard
by Moses, Hammond & Middleton
Attorneys

Sept. 18, 1923.
C. M. BULLARD
1,468,353
METHOD OF AND APPARATUS FOR TREATING LIQUIDS
Filed Dec. 4, 1920    2 Sheets-Sheet 2
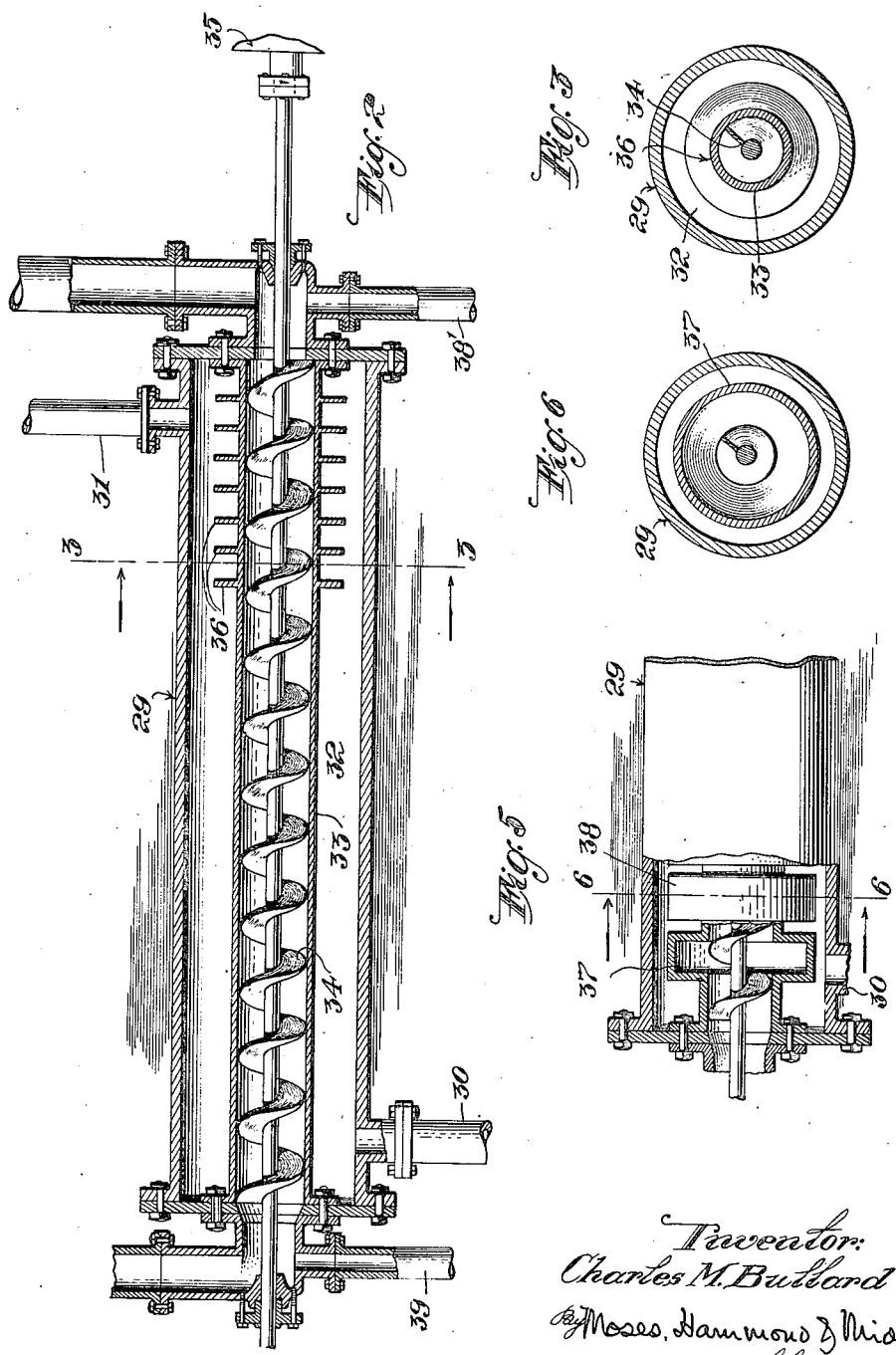

Patented Sept. 18, 1923.

1,468,353

UNITED STATES PATENT OFFICE.

CHARLES M. BULLARD, OF APPLETON, WISCONSIN.

METHOD OF AND APPARATUS FOR TREATING LIQUIDS.

Application filed December 4, 1920. Serial No. 428,410.

*To all whom it may concern:*

Be it known that I, CHARLES M. BULLARD, a citizen of the United States, residing in Appleton, county of Outagamie, and State of Wisconsin, have invented certain new and useful Improvements in Methods of and Apparatus for Treating Liquids, of which the following is a specification.

In digestors used in pulp making at present, the acid is introduced testing possibly 5.00% free $SO_2$. The moisture in the chips reduces this to perhaps 4.25% free $SO_2$ and then the steam introduced directly into the bottom of the digestor to heat the mass, further dilutes the acid until when the boiling point is reached, the percentage is down to possibly 2.00% free $SO_2$. If this percentage could be controlled and maintained around, say, 4.00% free $SO_2$, when the boiling point has been reached, it would permit shorter cooking time, lower cooking temperatures and pressures, longer and stronger resulting fibres, better color of fibres, and greater yield of fibres per cord of chips. Therefore, this invention relates by way of example to the controlling and maintaining of this acid strength throughout the cooking operation.

The invention is based upon the discovery that whereas if the liquid from the container is indirectly heated in or by a heating element, the lime and other solids in the acid or liquid will be precipitated thereon which precipitate acts as an insulator and very difficult to remove from the element; this precipitate will not be formed if the liquid is violently agitated at the same time that it is heated. Also I have discovered that if a precipitate by any chance should be formed, it can be removed by reversing the process, that is, to let the heating element cool below the temperature of the liquid and the liquid will thereupon dissolve the precipitate from the heating element. To restate this briefly: With the heating element hotter than the liquid, no precipitate will form thereon if the acid is violently agitated while heating and that if the liquid is hotter than the heating element, any precipitate on the heating element will be dissolved therefrom by the liquid.

Based upon this discovery, then, the invention consists essentially in taking a stream of the liquid from the container and passing it through a heating element to keep it heated to the proper temperature, violently agitating it during heating (if precipitation is to be prevented, and then returning the hot liquid to the container. In this way the liquid is heated indirectly, namely, no steam or other moisture bearing substance comes in contact with it. As it enters the container, because it has been heated above the temperature of the liquid therein, gas from the heated liquid is released, which gas bubbles upwardly through the mass in the container and gives increased circulation and distribution.

The invention has been illustrated by showing in the accompanying drawing an embodiment thereof which is the best of which I am at present informed, but it is to be understood that this embodiment is shown for illustrative purposes only for it is obvious that the invention is capable of many different embodiments and uses.

In the drawings:

Fig. 2 shows a vertical longitudinal section through the heating and agitating element;

Fig. 3 is a transverse section taken along the line 3—3 in Fig. 2;

Fig. 5 is a partial sectional view with parts broken away of a modified form of heating element, and Fig. 6 is a transverse view taken along the lines 6—6 in Fig. 5.

Figure 1:
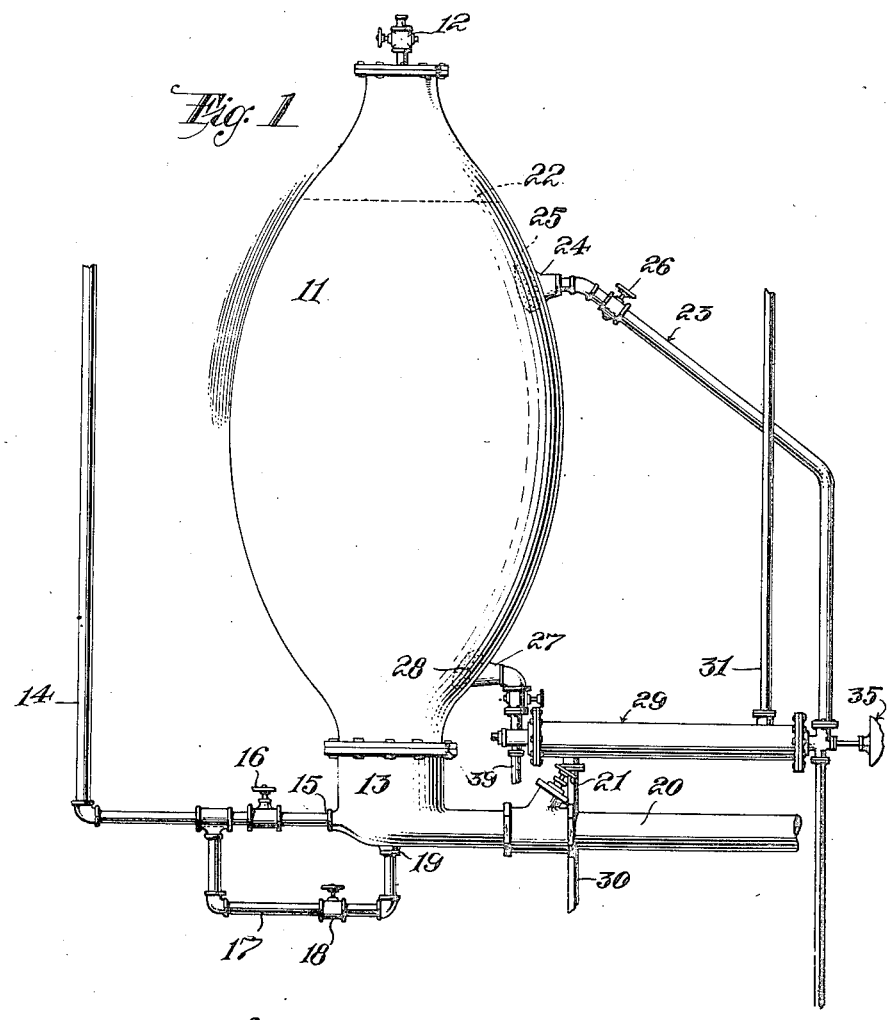
Figure 1 shows an elevation of a digestor with my apparatus in place.

In the drawings the numeral 11 indicates a digestor of the type used in pulp making, having a relief valve 12 at its top and a bottom T 13 at its base. The main steam line is indicated by 14 which enters the bottom T at 15 and is controlled by valve 16, and from this line there is an extension 17 having a valve 18 therein and this extension comprises the bottom steam line which enters the bottom T 13 at 19. The bottom T 13 terminates in a blowpipe 20 which is controlled by a blowvalve 21.

Below the liquid level 22 in the digestor a line or conduit 23 is adapted to enter the digestor at 24, the entrance to which conduit is guarded by a strainer 25 within the digestor. 26 is a valve controlling the conduit. This conduit passes along and back to the digestor at 27 where its outlet may or may not be equipped with another strainer 28. Encircling this conduit or incorporated therein is a heating and agitating element which is heated by means of a fluid such as steam through pipes 30 and 31.

Figure 4:
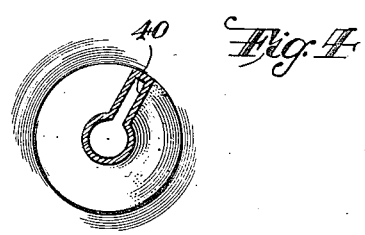
Fig. 4 is a transverse section taken through a modified form of agitator.

This element consists of an outer shell 29 having an annular space therein through which is circulated a heating medium such as steam or hot water, by means of an inlet and outlet 30 and 31. This annular space 32 is provided between the outer shell 29 and a section 33 of the conduit 23. Within this section 33 is a screw conveyor 34 rotated by some prime mover 35. The section 33 may be provided with flanges or fins 36 for facilitating the heating of the liquid within the section 33. These fins may be modified or hollowed, as shown at 37 and 38 in Figure 5, to further facilitate the heating of the liquid. In some instances it may be desirable to let into the section 33 a second liquid for cleaning or other purposes and this liquid could be introduced and removed from the inlet and outlet 38 and 39. It is to be understood that the liquid in the conduit 23 is taken from near the top of the digestor, passes through the section 33 and back through 27 to the digestor. The conveyor 34 may either be made solid, as shown in Fig. 2, or hollow, as shown at 40 in Figure 4.

In operation the chips and acid are put into the digestor in the usual way and under ordinary circumstances steam would then be added directly to the digestor by means of the steam line to maintain a cooking temperature of the acid or liquid in the digestor, but if the steam is thus added directly to the liquid to heat it, the percentage of free $SO_2$ diminishes from say 5.00% to 2.00% free $SO_2$ by the time the boiling point of the chips and liquid is reached.

In distinction from this I draw the liquor down through the conduit 23 into the element 29 wherein it is heated indirectly by the steam or other fluid in the annular space or jacket 32 and during this heating the liquid is violently agitated by means of the screw conveyor 34 in the section 33 of the conduit, for this conveyor not only serves to enforce the circulation through the conduit 23, but violently agitates the liquor while it passes through the heating element which is indispensable to the prevention of the formation of a lime precipitate upon the conveyor or the section 33 which will inevitably take place if agitation is not present. The heated liquid is then returned to the digestor near its bottom where, because it has been heated above the temperature of the mass within the digestor, liberates gas, which bubbles upwardly thoroughly and uniformly saturating the liquid in the container with the gas and further facilitates or accelerates the circulation of the mass, thereby causing a gradual rise in the temperature and pressure in the container. In this way the efficiency of the device is decidedly increased with results such as have been enumerated above.

If it should happen that a precipitate does take place in the section 33, on the conveyor 34, or elsewhere, I have found that this precipitate will be quickly dissolved and removed by an acid passed through the section 33, which acid is hotter than the section 33 or the conveyor 34. In other words, the heating element is cooled after use and then hot acid or liquor circulated through it from inlet 38 and outlet 39, in from 24 and out at 27, whereupon the acid will dissolve the precipitate and completely clean the heating element.

It will thus be seen that among the important features of this invention are the controlling of the relative temperatures between the heating element and the liquid which passes therethrough; the provision of means for agitating the liquid where precipitation is to be prevented; the indirect heating of the liquid without diluting it; the acceleration of the circulation in the container; and the uniform saturation by the liquid in the container of the gas arising from the returning heated liquid.

This invention may also be used in processes such as the sulphate or the soda but here as no precipitate will be formed, agitation is not indispensable.

What I claim is:

1. A method of treating a liquid in a container consisting in forming a stream of liquid in circuit with the container, passing the stream of liquid through a heating element to heat the liquid in the stream, and mechanically violently agitating the liquid while the liquid is in direct contact with the heating element.

2. The method of claim 1 with the additional step of scraping the heating element where the liquid comes in contact therewith.

3. In combination with a container as a digestor, a conduit in circuit with the digestor and taking liquid therefrom, a heating element encircling the conduit and mechanical means for producing violent agitation of the liquid while in contact with the heating element.

4. The device of claim 3, in which the agitating means comprise a liquid propelling device.

5. The device of claim 3 in which the agitating means comprise a liquid propelling device as a screw.

6. A device of the class described and in combination with a container, a conduit in circuit therewith, a liquid propelling device in said circuit, heat radiating means encircling the conduit and an annular chamber encircling the heat radiating means.

In testimony whereof I have affixed my signature to this specification.

CHAS. M. BULLARD.